(12) United States Patent
    Balistreri

(10) Patent No.: US 10,807,413 B2
(45) Date of Patent: Oct. 20, 2020

(54) FRONT AXLE WHEEL ASSEMBLY AND THE TIRE INFLATION SYSTEM MADE THEREWITH

(71) Applicant: Dana Heavy Vehicle Systems Group, LLC, Maumee, OH (US)

(72) Inventor: Lucas A. Balistreri, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 344 days.

(21) Appl. No.: 15/887,654

(22) Filed: Feb. 2, 2018

(65) Prior Publication Data

US 2018/0215201 A1    Aug. 2, 2018

Related U.S. Application Data

(60) Provisional application No. 62/453,797, filed on Feb. 2, 2017.

(51) Int. Cl.
    *B60B 35/16*   (2006.01)
    *B60C 23/00*   (2006.01)
    *B60B 35/00*   (2006.01)
    *B60B 35/14*   (2006.01)

(52) U.S. Cl.
    CPC ............ *B60B 35/16* (2013.01); *B60B 35/003* (2013.01); *B60B 35/163* (2013.01); *B60C 23/003* (2013.01); *B60B 35/14* (2013.01); *Y02T 10/86* (2013.01)

(58) Field of Classification Search
    CPC ..... B60C 23/003; B60B 35/16; B60B 35/163; B60B 35/003; B60B 35/14
    See application file for complete search history.

(56) References Cited

U.S. PATENT DOCUMENTS

| 1,083,847 | A  | * | 1/1914  | McDowell et al. | .. B60C 23/003 |
|           |    |   |         |                 | 152/417 |
| 4,844,138 | A  |   | 7/1989  | Kokubu          |         |
| 5,203,391 | A  | * | 4/1993  | Fox ........................ | B60C 23/003 |
|           |    |   |         |                 | 152/415 |
| 5,353,890 | A  | * | 10/1994 | Clohessy ............ | B60K 17/3515 |
|           |    |   |         |                 | 180/247 |
| 5,535,516 | A  |   | 7/1996  | Goodell et al.  |         |
| 6,283,186 | B1 | * | 9/2001  | Krisher .................. | B60C 23/003 |
|           |    |   |         |                 | 152/417 |
| 6,668,888 | B1 | * | 12/2003 | Beesley ................ | B60C 23/003 |
|           |    |   |         |                 | 152/415 |
| 6,719,028 | B2 | * | 4/2004  | D'Amico .............. | B60C 23/003 |
|           |    |   |         |                 | 152/415 |
| 6,918,637 | B2 |   | 7/2005  | Hahn            |         |

(Continued)

FOREIGN PATENT DOCUMENTS

WO    WO-2013056988 A1 *    4/2013    ......... B60C 23/0498

*Primary Examiner* — Kip T Kotter

(74) *Attorney, Agent, or Firm* — McCoy Russell LLP

(57) ABSTRACT

An axle assembly having a spindle yoke defining at least one fluid conduit therethrough. A collector ring disposed about the spindle yoke. A seal housing coupled with a knuckle, and the seal housing disposed coaxially with the collector ring. First and second rotary seals disposed radially between the collector ring and the seal housing. Additionally, a port disposed in the knuckle, wherein the port is in fluid communication with the spindle yoke at least one fluid conduit via the seal housing and the collector ring.

15 Claims, 14 Drawing Sheets

(56) References Cited

U.S. PATENT DOCUMENTS

| | | | |
|---|---|---|---|
| 8,915,275 B2 | 12/2014 | Resare et al. | |
| 8,931,534 B2 | 1/2015 | Eaton et al. | |
| 9,370,974 B2* | 6/2016 | Knapke | B60C 23/003 |
| 9,409,449 B2* | 8/2016 | Cis | B60C 23/003 |
| 9,566,832 B2 | 2/2017 | Sherman et al. | |
| 2016/0361957 A1* | 12/2016 | Burke | B60B 27/0047 |
| 2017/0120674 A1 | 5/2017 | White | |
| 2018/0056732 A1* | 3/2018 | Ingram | B60B 27/0047 |

* cited by examiner

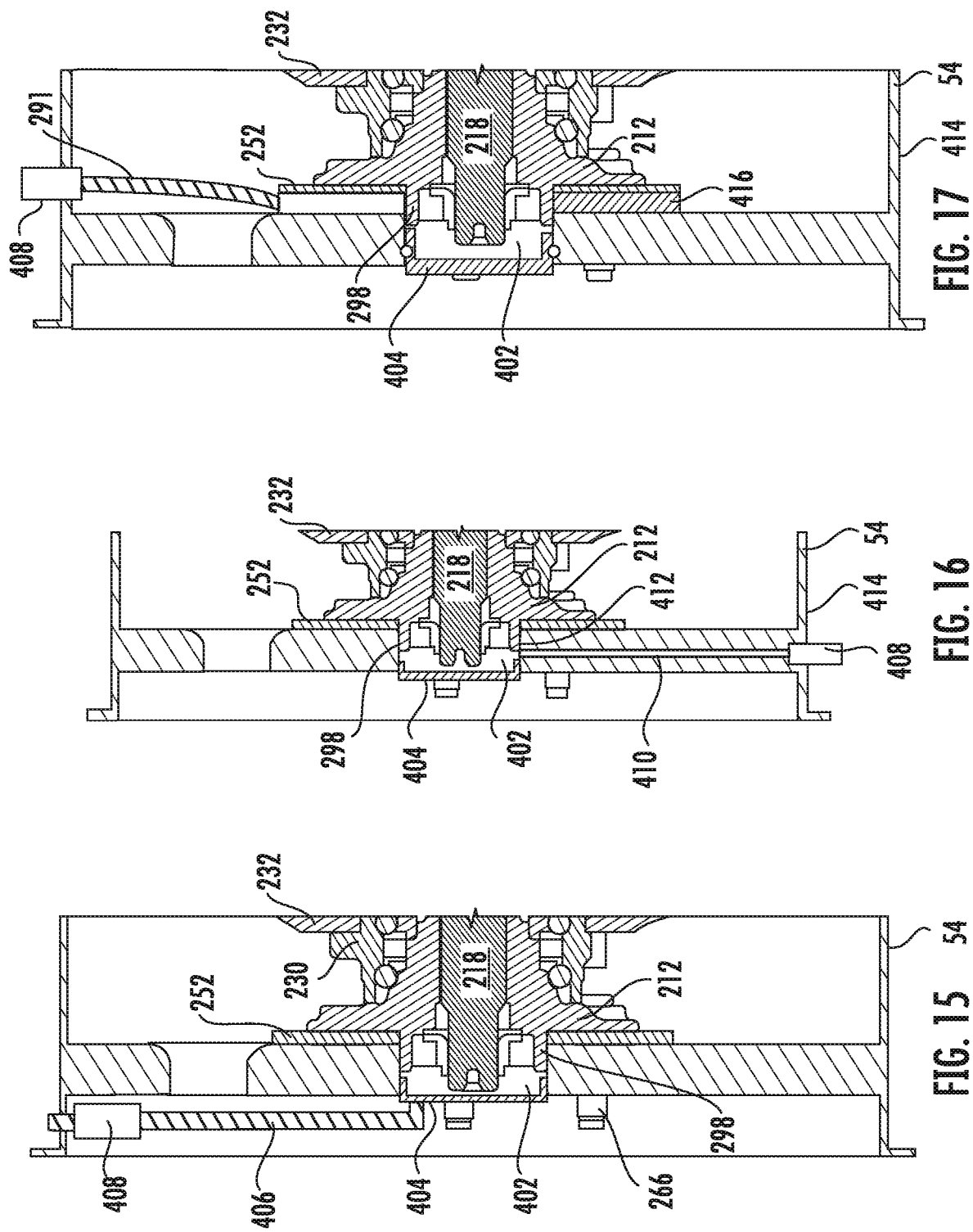

FRONT AXLE WHEEL ASSEMBLY AND THE TIRE INFLATION SYSTEM MADE THEREWITH

RELATED APPLICATIONS

The present application claims the benefit to U.S. Provisional Application No. 62/453,797 filed on Feb. 2, 2017, which is incorporated herein by reference in its entirety.

BACKGROUND

The present disclosure relates to tire inflation systems and more particularly to a front axle wheel assembly utilized in a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire longevity. Furthermore, tire inflation systems increase a vehicle's maneuverability over differing terrains, and increase a vehicle's mobility through varying environmental conditions. Additionally, tire inflation systems reduce maintenance requirements.

Tire inflation systems communicate pressurized fluid to a wheel assembly. Conventional tire inflation systems are limited by their package size. In view of the above, there remains a need for a tire inflation system operable in a decreased package size.

SUMMARY

The presently disclosed subject matter describes an axle assembly having a spindle yoke defining at least one fluid conduit therethrough. The axle assembly also includes a collector ring disposed about the spindle yoke. A seal housing is coupled with a knuckle, and the seal housing is disposed coaxially with the collector ring. First and second rotary seals are disposed radially between the collector ring and the seal housing. Additionally, a port is disposed in the knuckle, and the port is in fluid communication with the spindle yoke at least one fluid conduit via the seal housing and the collector ring.

In some embodiments, the collector ring further includes a first radially inner surface and a second radially inner surface, wherein the second surface and a surface of the spindle yoke define a collector ring chamber. The collector ring may also include an aperture through the collector ring in fluid communication with the collector ring chamber.

In some embodiments, the collector ring, the seal housing, the first rotary seal, and the second rotary seal define a seal chamber.

In some embodiments, the seal housing further includes a radially outer surface defining an annular recess, wherein the recess and a surface of the knuckle define a seal housing chamber. The seal housing may also include an aperture through a radially inner surface of the seal housing in fluid communication with the recess.

In some embodiments, the spindle yoke further includes at least one first conduit in fluid communication with a collector ring chamber defined by the collector ring and the spindle yoke. The spindle yoke may also include at least one second conduit in fluid communication with the at least one first conduit.

In some embodiments, the at least one first conduit is disposed transverse to a longitudinal axis of the spindle yoke, and the at least one second conduit is disposed parallel to a longitudinal axis of the spindle yoke.

In some embodiments, the at least one second conduit includes a single conduit disposed coaxially with a longitudinal axis of said spindle yoke.

In some embodiments, the axle assembly further includes an inner bearing flange disposed about the spindle yoke. The axle assembly may also include an inner bearing flange chamber defined by the inner bearing flange and the spindle yoke, wherein the at least one second conduit is in fluid communication with the inner bearing flange chamber.

In some embodiments, the spindle yoke includes a blind spline in fluid communication with the inner bearing flange chamber.

The presently disclosed subject matter also describes an axle assembly including a spindle yoke defining at least one fluid conduit therethrough, and a collector ring disposed about the spindle yoke. The axle assembly may also include a seal housing coupled with a knuckle, wherein the seal housing is disposed coaxially with the collector ring. First and second rotary seals may be disposed radially between the collector ring and the seal housing. Additionally, a port may be disposed in the seal housing, wherein the port is in fluid communication with the spindle yoke at least one fluid conduit via the seal housing and the collector ring.

In some embodiments, the axle assembly may also include a tube bracket coupled with the seal housing, wherein the tube bracket is in fluid communication with the port.

In some embodiments, the seal housing further includes a portion protruding in a radial direction, wherein the port is defined by the portion. The seal housing may also include a fluid conduit disposed through the portion, wherein the fluid conduit is in fluid communication with the port, and an aperture may be disposed through a radially inner surface of the seal housing in fluid communication with the fluid conduit.

In some embodiments, the knuckle further includes a recess in an inboard surface thereof, wherein the seal housing radially protruding portion is at least partially disposed within the recess.

In some embodiments, the collector ring further includes a first radially inner surface and a second radially inner surface, wherein the second surface and a surface of the spindle yoke define a collector ring chamber. The collector ring may also include an aperture through the collector ring in fluid communication with the collector ring chamber.

In some embodiments, the collector ring, the seal housing, the first rotary seal, and the second rotary seal define a seal chamber.

In some embodiments, the spindle yoke further includes at least one first conduit in fluid communication with a collector ring chamber defined by the collector ring and the spindle yoke. The spindle yoke may also include at least one second conduit in fluid communication with the at least one first conduit.

In some embodiments, the at least one second conduit includes a single conduit disposed coaxially with a longitudinal axis of the spindle yoke.

In some embodiments, the axle assembly further includes an inner bearing flange disposed about the spindle yoke, and an inner bearing flange chamber is defined by the inner bearing flange and the spindle yoke, wherein the at least one second conduit is in fluid communication with the inner bearing flange chamber.

In some embodiments, the spindle yoke further includes a blind spline in fluid communication with the inner bearing flange chamber.

In some embodiments, the axle assembly further includes a hub cap coupled with the inner bearing flange, wherein the hub cap and the inner bearing flange define a hub cap chamber in fluid communication with the blind spline. The axle assembly may also include a hose in fluid communication with the hub cap chamber, and a tire in selective fluid communication with the hose.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

FIG. 15 is a cross-sectional view a portion of a wheel end assembly according to an embodiment of the tire inflation system of FIG. 1;

FIG. 16 is a cross-sectional view a portion of a wheel end assembly according to another embodiment of the tire inflation system of FIG. 1; and FIG. 17 is a cross-sectional view a portion of a wheel end assembly according to yet another embodiment of the tire inflation system of FIG. 1.

DETAILED DESCRIPTION

Figure 1:
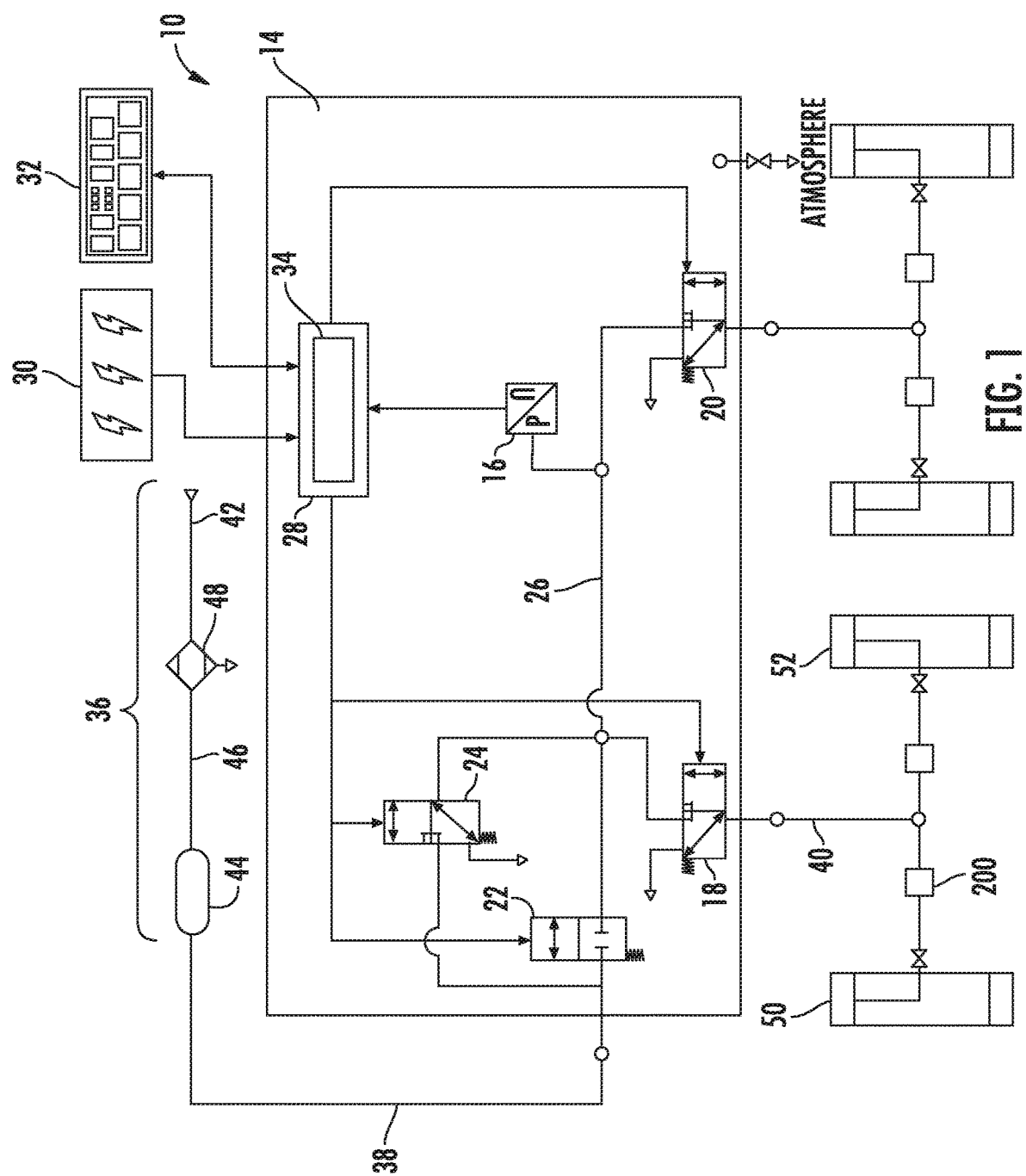
FIG. 1 depicts a schematic view of a tire inflation system according to an embodiment of the presently disclosed subject matter.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a compact or mid-size sport utility vehicle. In addition, the tire inflation system 10 described herein may have applications in both light duty and heavy duty vehicles, and for passenger, commercial, and off-highway vehicles. It would be understood by one of ordinary skill in the art that the tire inflation system 10 also has industrial, locomotive, military, agricultural, and aerospace applications.

The tire inflation system 10 is described herein with reference to a pressurized fluid such as, for example, air. The tire inflation system 10 may have inflate and/or deflate capability to allow a tire pressure to be increased and/or decreased.

As illustrated in FIG. 1, the tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those skilled in the art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may at certain times be in fluid communication with a plurality of tires.

The tire inflation system 10 further comprises a wheel end assembly 200. The wheel end assembly 200 is associated with the tire 50. The wheel end assembly 200 is utilized, inter alia, to transfer pressurized air between portions of the tire inflation system 10. It is to be understood that, except where expressly specified to the contrary, the communication of pressurized fluid between the components described herein is facilitated by the sealing of all pressurized fluid flow paths. For example, in an area of fluid communication between components, the components may be sealed via an interference fit between said components or a third component; the components may alternatively be sealed via a static elastomeric seal or a rotary seal.

Figure 2:
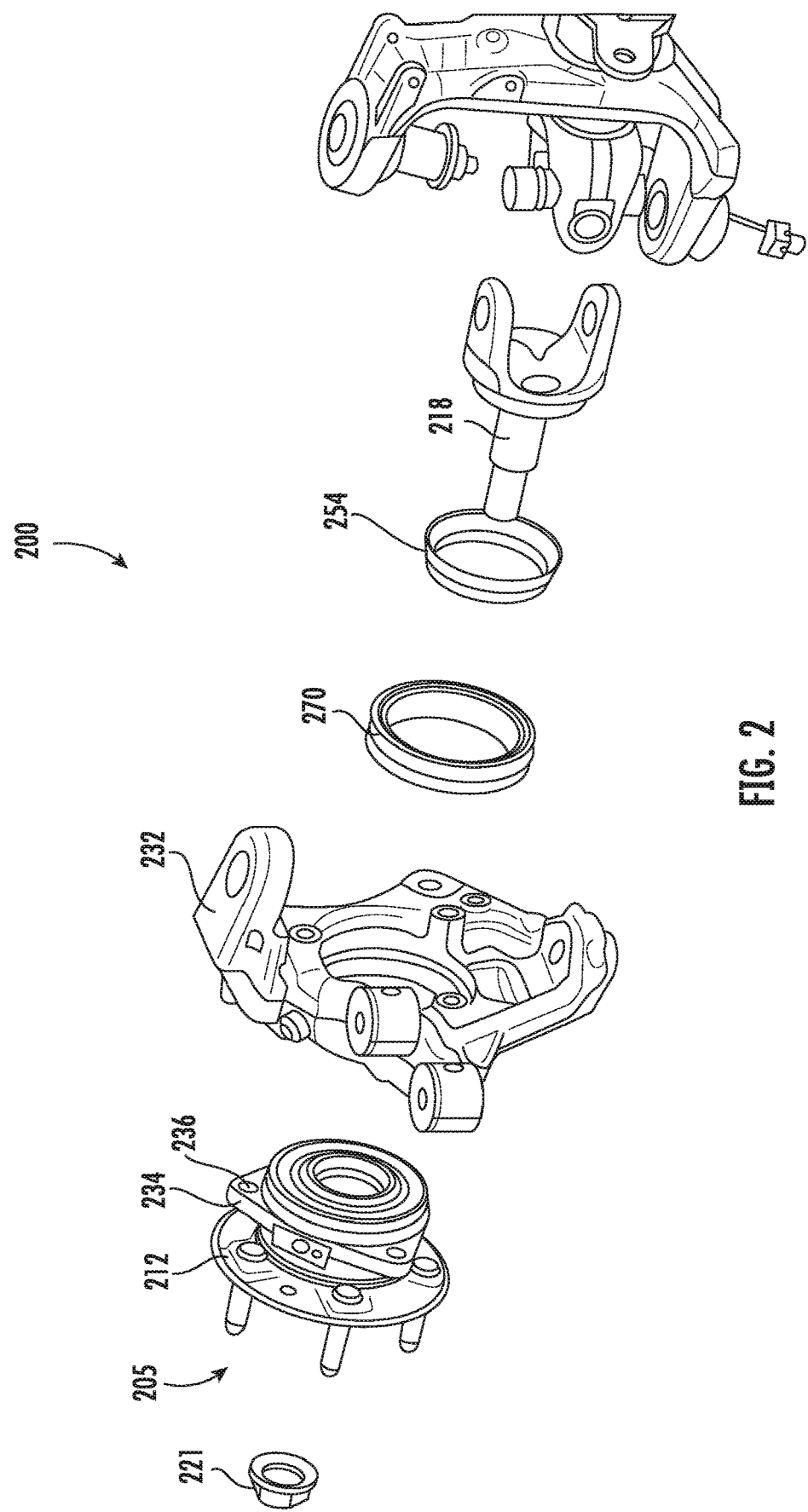
FIG. 2 is an exploded view of a portion of an embodiment of a wheel end assembly of the tire inflation system of FIG. 1.
Figure 3:
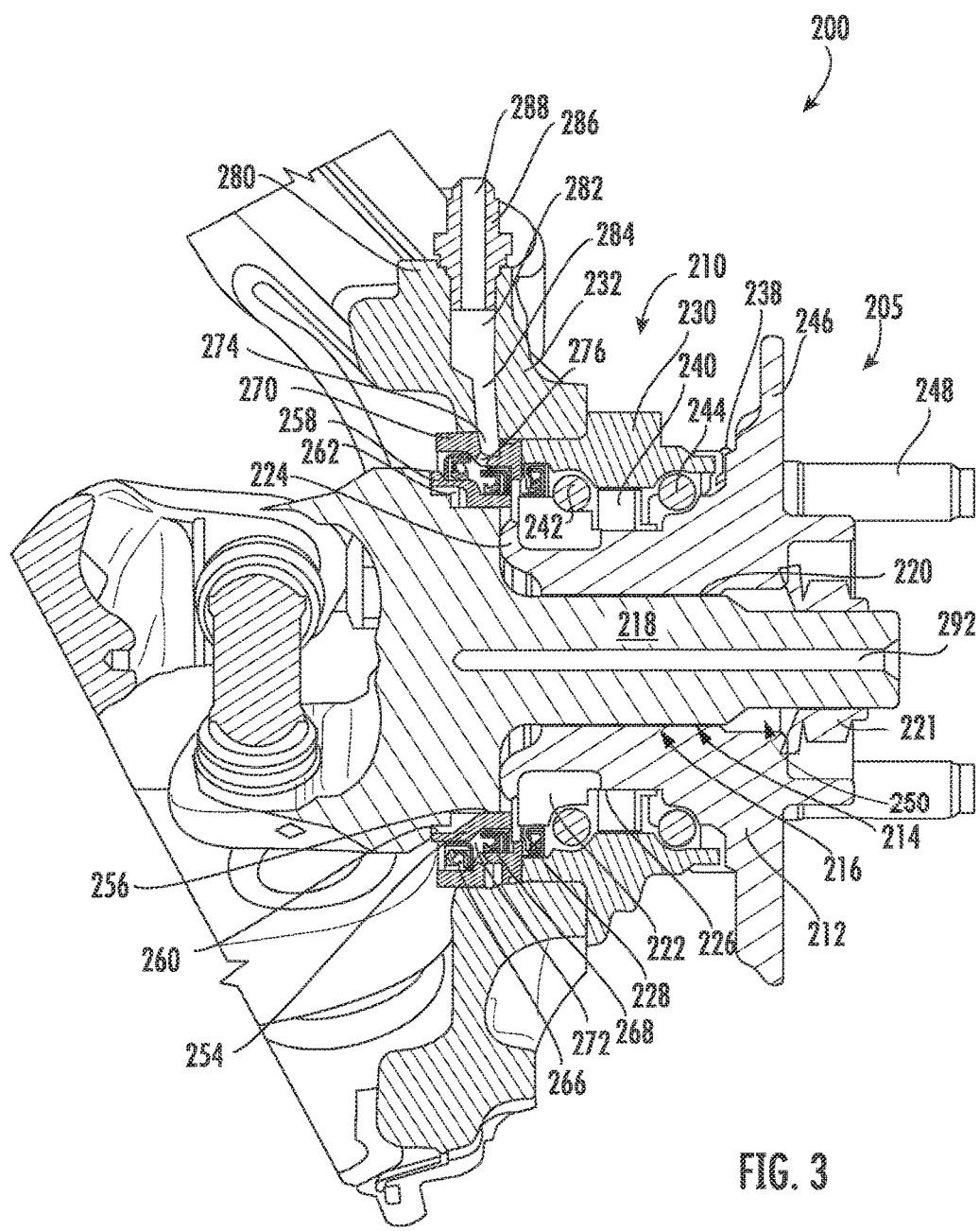
FIG. 3 is a cross-sectional view of a portion of the wheel end assembly of FIG. 2.

As illustrated in FIGS. 2 and 3, in an embodiment, the wheel end assembly 200 comprises a hub assembly 205. Referring now to FIG. 3, the hub assembly 205 comprises a bearing assembly 210. The bearing assembly 210 includes an inner bearing flange 212. A radially inner surface 214 of the inner bearing flange 212 defines a plurality of splines 216 for engaging complimentary splines 220 on a spindle yoke 218. The inner bearing flange 212 may be captured on the spindle yoke 218 via a threaded nut 221. The threads of the nut 221 may engage the spindle yoke 218 and abut an outboard surface of the inner bearing flange 212.

In an embodiment, an inner race 222 of the bearing assembly 210 is disposed about, and coupled for rotation with, the inner bearing flange 222. The inner race 222 may be positioned in an annular recess defined by a lip 224 and a shoulder 226 of the inner bearing flange 212. The lip 224 is disposed at the inboard end of the inner bearing flange 212. The shoulder 226 is defined by portions of the inner bearing flange 212 having different radially outer diameters.

A first rotary oil seal 228 is sealingly engaged between the inner race 222 and an outer bearing flange 230. The outer bearing flange 230 is radially disposed about the inner race 222 and the inner bearing flange 212. The outer bearing flange 230 may be coupled with a steering knuckle 232 via mechanical fasteners. Referring now to FIG. 2, in an embodiment, the outer bearing flange 230 comprises three lobes 234 disposed about the outer surface thereof. The lobes 234 may be equilaterally disposed about the outer bearing flange 230. Further, each lobe 234 includes an aperture 236 therethrough. Mechanical fasteners (not depicted) are disposed through each lobe aperture 236 to couple the outer bearing flange 230 with the steering knuckle 232.

As illustrated in FIG. 3, a second rotary oil seal 238 is sealingly engaged between the inner bearing flange 212 and a second portion of the outer bearing flange 230 at an outboard end of the bearing assembly 210. The first and second rotary oil seals 228, 238 define an annular chamber 240 between the inner race 222 and the outer bearing flange 230. Bearing lubricant may be located in the chamber 240.

A first rolling element 242 is disposed adjacent to an outboard side of the first rotary seal 238. The first rolling element 242 is disposed about the inner race 222, radially between the inner race 222 and the outer bearing flange 230. A second rolling element 244 is disposed about the inner bearing flange 212, radially between the inner bearing flange 212 and the outer bearing flange 230. In an embodiment, the first and second rolling elements 242, 244 may comprise a plurality of spherical bodies.

The inner bearing flange 212 further comprises a radially extending flange 246 located at an outboard end thereof. The outboard flange 246 includes a plurality of axially extending apertures 250 therethrough. A plurality of studs 248 are disposed in the apertures 250 by which a wheel 54 and/or a rotor 252 (see FIGS. 15-17) may be coupled with the hub assembly 205.

Figure 4A:
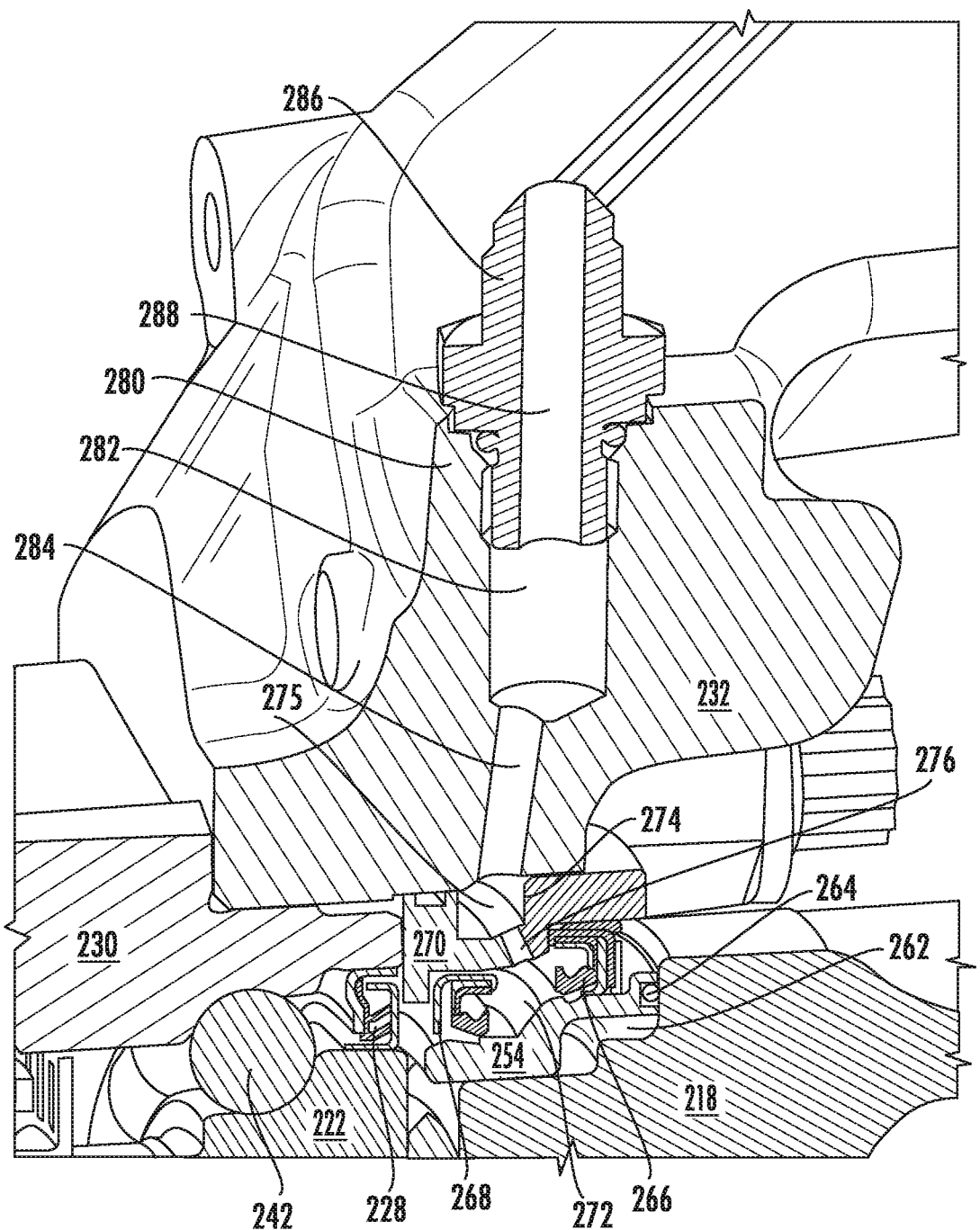
FIG. 4A is another cross-sectional view of a portion of the wheel end assembly of FIG. 2.
Figure 5:
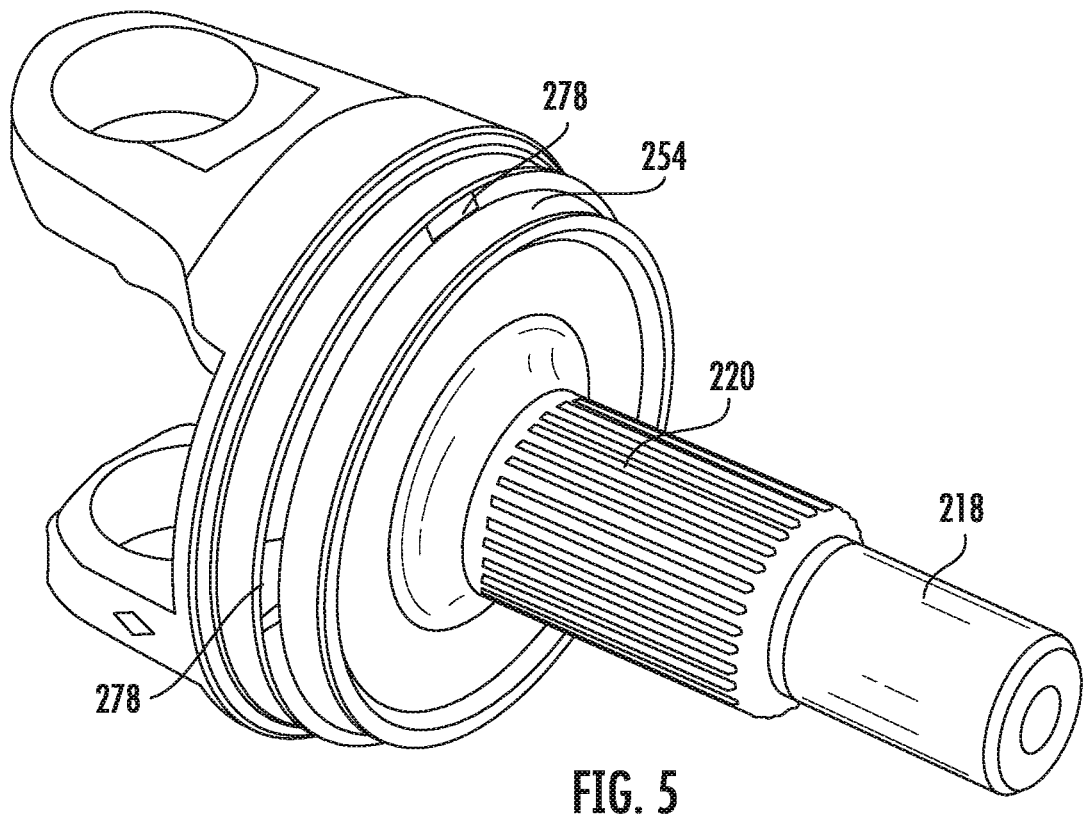
FIG. 5 is a perspective view of a portion of the wheel end assembly of FIG. 2.
Figure 6:
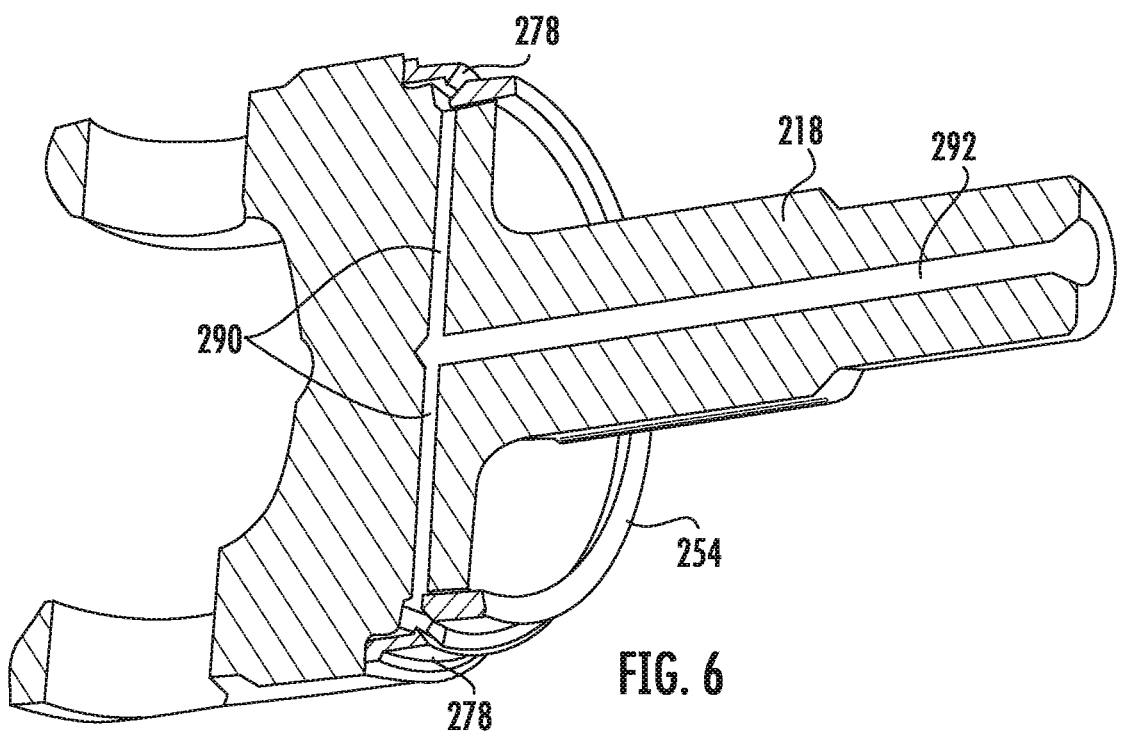
FIG. 6 is a cross-sectional view of the portion of the wheel end assembly of FIG. 5.

As illustrated in FIGS. 3 and 5, in an embodiment, the wheel end assembly 200 further comprises a collector ring 254 disposed about the spindle yoke 218. A first radially inner surface 256 of the collector ring 254 is sealingly coupled with a surface of the spindle yoke 218. In addition, an axially inboard surface 258 of the collector ring 254 is sealingly coupled with a surface of the spindle yoke 218. The collector ring 254 may be stepped such that a second radially inner surface 260 has a greater diameter than the first inner surface 256. The inboard surface 258 is located adjacent to the second inner surface 260 such that the collector ring 254 and the spindle yoke 218 define an annular first fluid chamber 262. The first fluid chamber 262 may also be referred to herein as the collector ring chamber. The sealing engagement between the spindle yoke 218 and the collector ring inboard surface 258 may be facilitated by an O-ring 264 (see FIG. 4A) or a static elastomeric seal disposed therebetween.

The collector ring 254 may also comprise a stepped outer surface about which a first rotary seal 266 and a second rotary seal 268 are disposed. A seal housing 270 is coupled with the steering knuckle 232. The seal housing 270 comprises a first and second inner surface having different diameters for engaging the first and second rotary seals 266, 268. The seal housing 270, the first and second rotary seals 266, 268, and the collector ring 254 define an annular second fluid chamber 272 therebetween. The second fluid chamber 272 may also be referred to herein as the seal chamber 272.

The position of the first rotary seal 266 may be secured in the seal housing 270 via, for example, a snap ring (not depicted). In other embodiments (not depicted), the position of the first rotary seal 266 may be secured in the seal housing 270 via a collar press-fit into the seal housing 270 or via staking a portion of the first rotary air seal 266 to the seal housing 270. Persons having skill in the art will recognize that other methods of seal retention may be utilized to prevent displacement of the first rotary seal 266 under pressurization of the second fluid chamber 272.

The seal housing 270 includes a first radially outer surface 271A and a second radially outer surface 271B. The first outer surface 271A may be sealingly coupled with the steering knuckle 232 via a press fit. The second outer surface 271B may be sealingly coupled with the steering knuckle 232 via a press fit, or by utilizing an O-ring gland or a static elastomeric seal. The seal housing 270 includes an annular recess 274 in a radially outer surface thereof, between the first and second outer surfaces 271A, 271B.

One or more apertures defining fluid conduits 276 (see FIG. 4A) disposed through the annular recess 274 and a radially inner surface of the seal housing 270 enables fluid communication between the annular recess 274 and the second fluid chamber 272. One or more fluid conduits 278 are disposed through the collector ring 254, placing the first and second fluid chambers 262, 272 in fluid communication. The seal housing annular recess 274 and a surface of the steering knuckle 232 define a third annular fluid chamber 275. The third chamber 275 may also be referred to herein as the seal housing chamber 275.

In an embodiment, the steering knuckle 232 comprises an upper portion 280 having a port 282 therein. In one embodiment, the port 282 may be positioned adjacent to a tie rod portion of the steering knuckle 232. The port 282 is in fluid communication with a fluid conduit 284 through the steering knuckle 232. The fluid conduit 284 is in fluid communication with both the port 282 and the seal housing annular recess 274. A tube fitting 286 may be coupled with the port 282. In an embodiment, the tube fitting 286 may include a threaded portion for engaging complimentary threads in the port 282. A fluid conduit 288 through the tube fitting 286 places the port 282 in fluid communication with the fluid control circuit 40.

Figure 4:
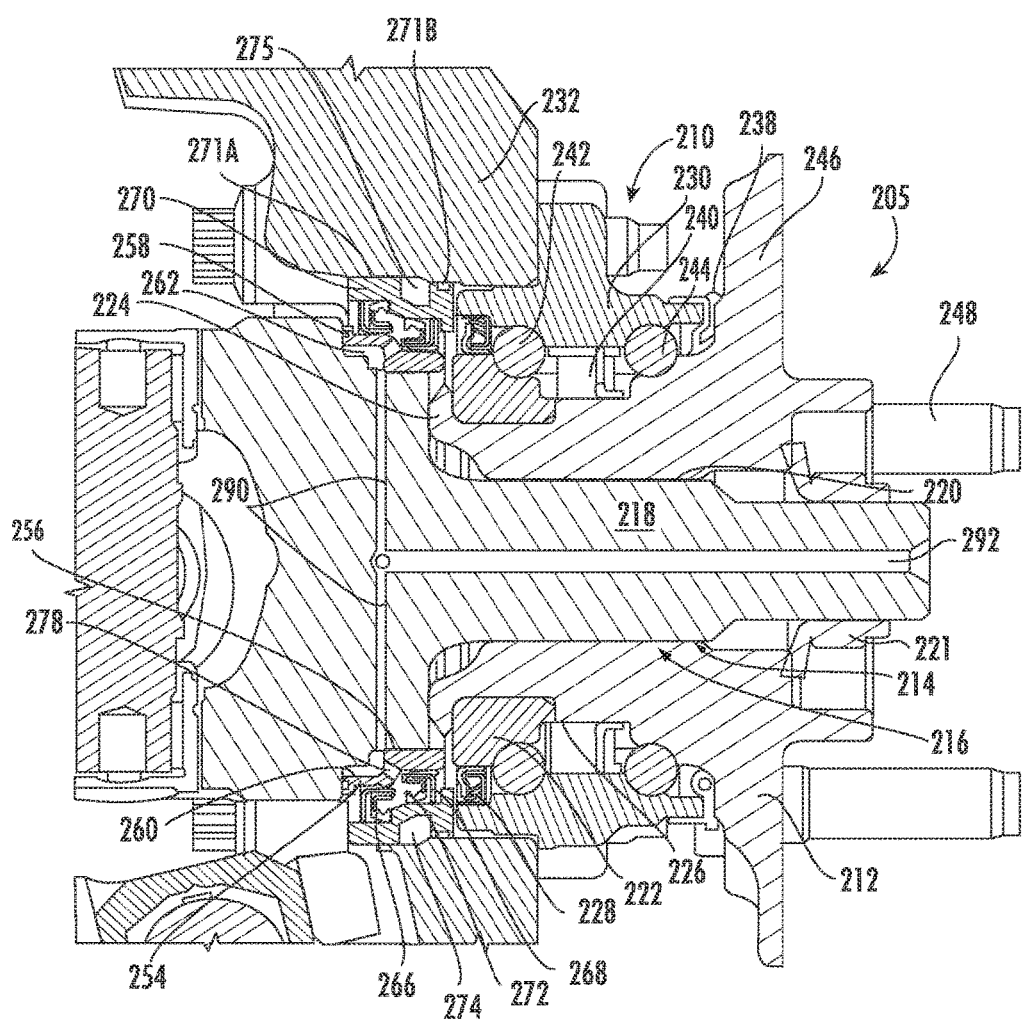
FIG. 4 is another cross-sectional view of a portion of the wheel end assembly of FIG. 2.

As illustrated in FIG. 4, in an embodiment, the spindle yoke 218 includes one or more first fluid conduits 290 in fluid communication with the chamber 262. The first fluid conduit 290 is in fluid communication with a second fluid conduit 292 disposed generally axially through the spindle yoke 218. The second fluid conduit 292 extends through the outboard end of the spindle yoke 218.

In operation, when utilizing the tire inflation system 10 to increase tire pressure, pressurized fluid flows through tube fitting fluid conduit 288 into the port 282. The pressurized fluid in the port 282 flows through the steering knuckle fluid conduit 284 into the seal housing annular recess 274. The pressurized fluid in the annular recess 274 then flows through seal housing one or more fluid conduits 276 into the second fluid chamber 272. The pressurized fluid in the second fluid chamber 272 then flows through the collector ring one or more fluid conduits 278 into the first fluid chamber 262. The pressurized fluid may remove heat from the collector ring 254 as it flows through the second fluid chamber 272 and collects in the first fluid chamber 262. Decreasing the temperature of the collector ring 254 facilitates increased longevity of the first and second rotary seals 266, 268. From the first fluid chamber 262, the pressurized fluid flows through the one or more first spindle yoke conduits 290 to the second spindle yoke conduit 292.

Figure 7:
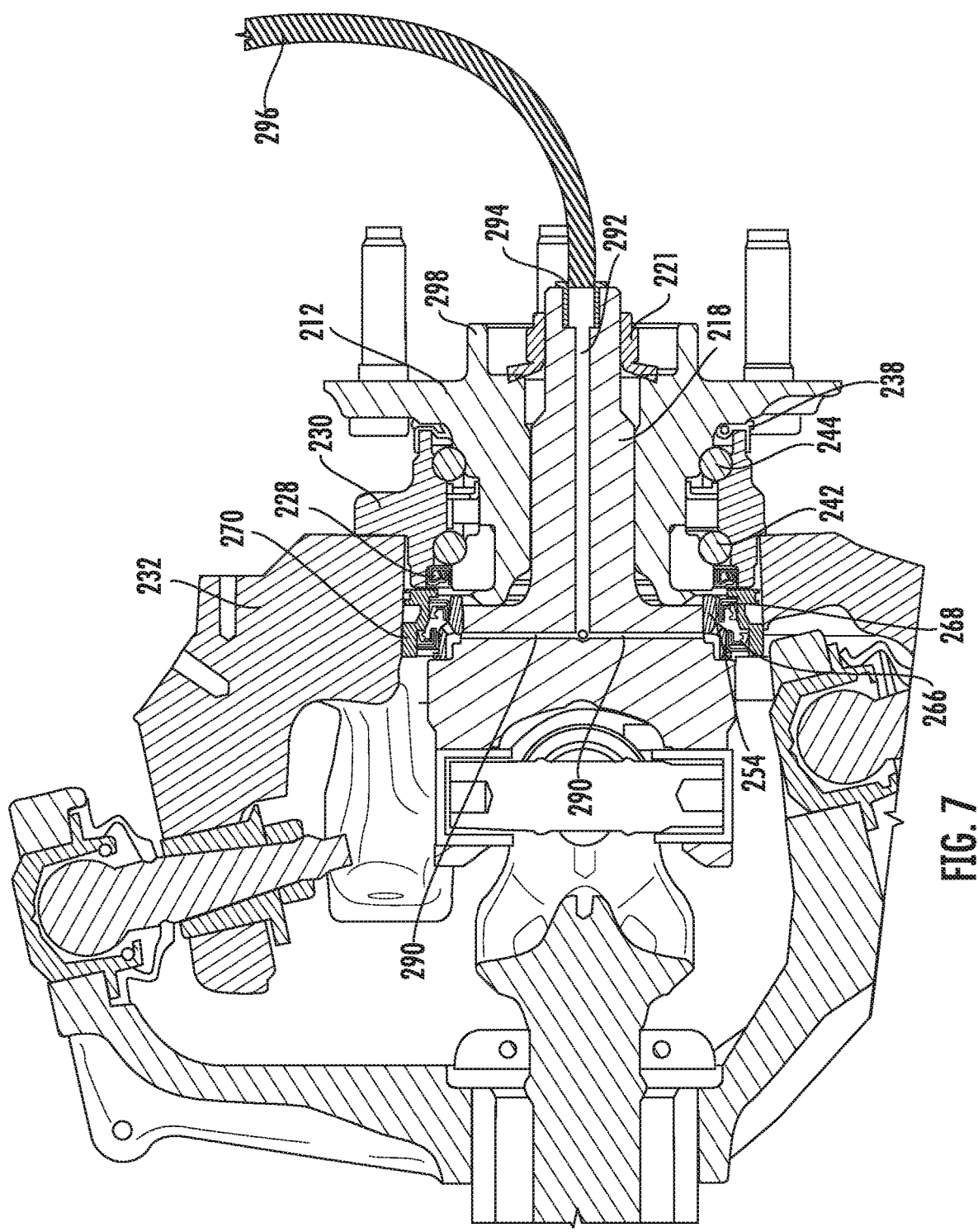
FIG. 7 is another cross-sectional view of the portion of the wheel end assembly of FIG. 2.

As illustrated in FIG. 7, in an embodiment, a coupling 294 may be sealingly coupled with an outboard portion of the second spindle yoke conduit 292. A hose 296 is in fluid communication with the second spindle yoke conduit 292 via the coupling 294. The hose 296 is in selective fluid communication with a tire 50.

The inner bearing flange 212 includes an axially extending outboard flange 298. In another embodiment (not depicted), a hubcap may be disposed about the spindle yoke 218 and sealingly engaged with the outboard flange 298 to define a fluid chamber. In this embodiment, the hubcap fluid chamber is in fluid communication with the second spindle yoke conduit 292 and the hose 296.

Figure 8:
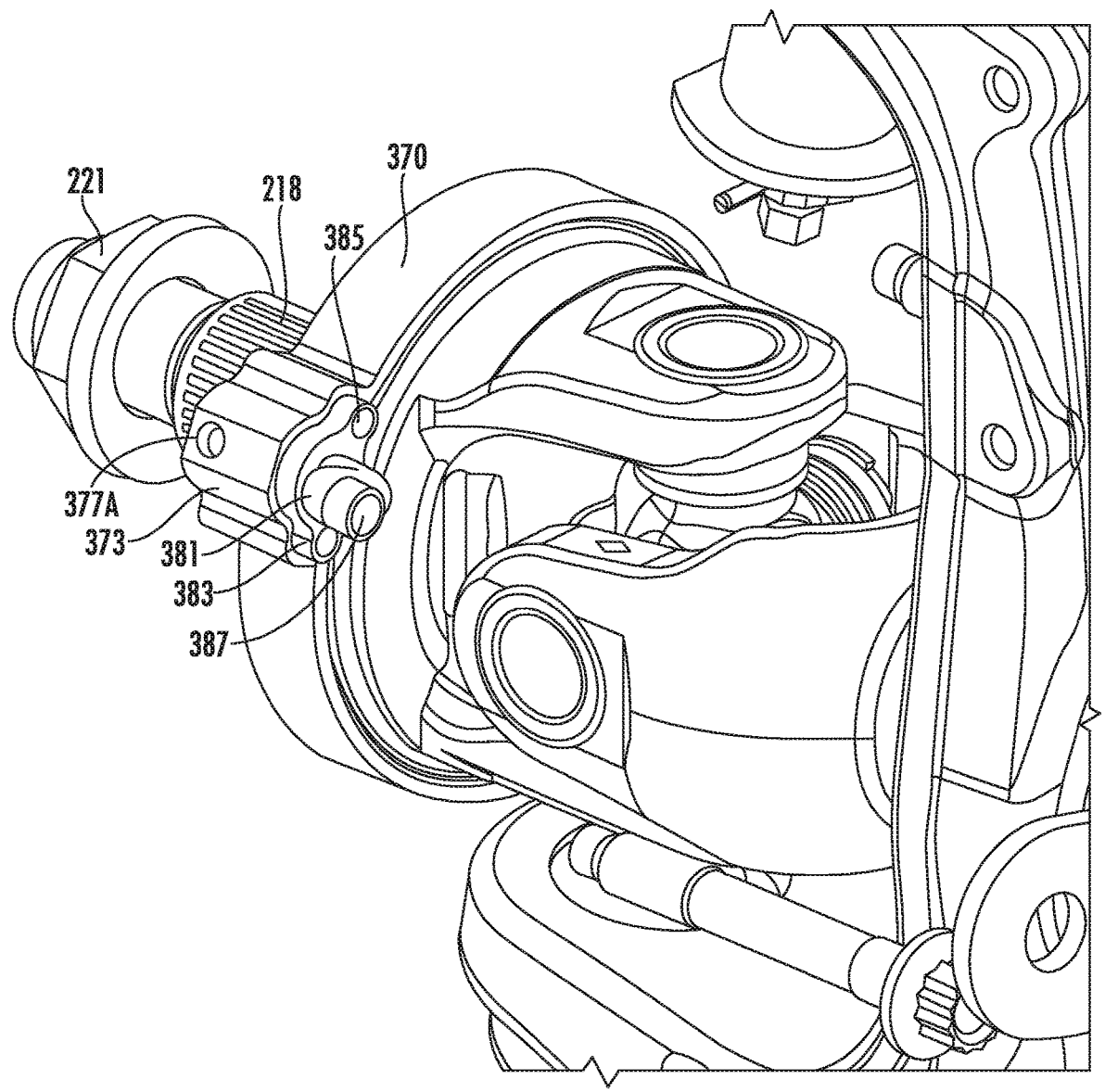
FIG. 8 is a perspective view of a portion of a wheel end assembly according to another embodiment of the presently disclosed subject matter.
Figure 9:
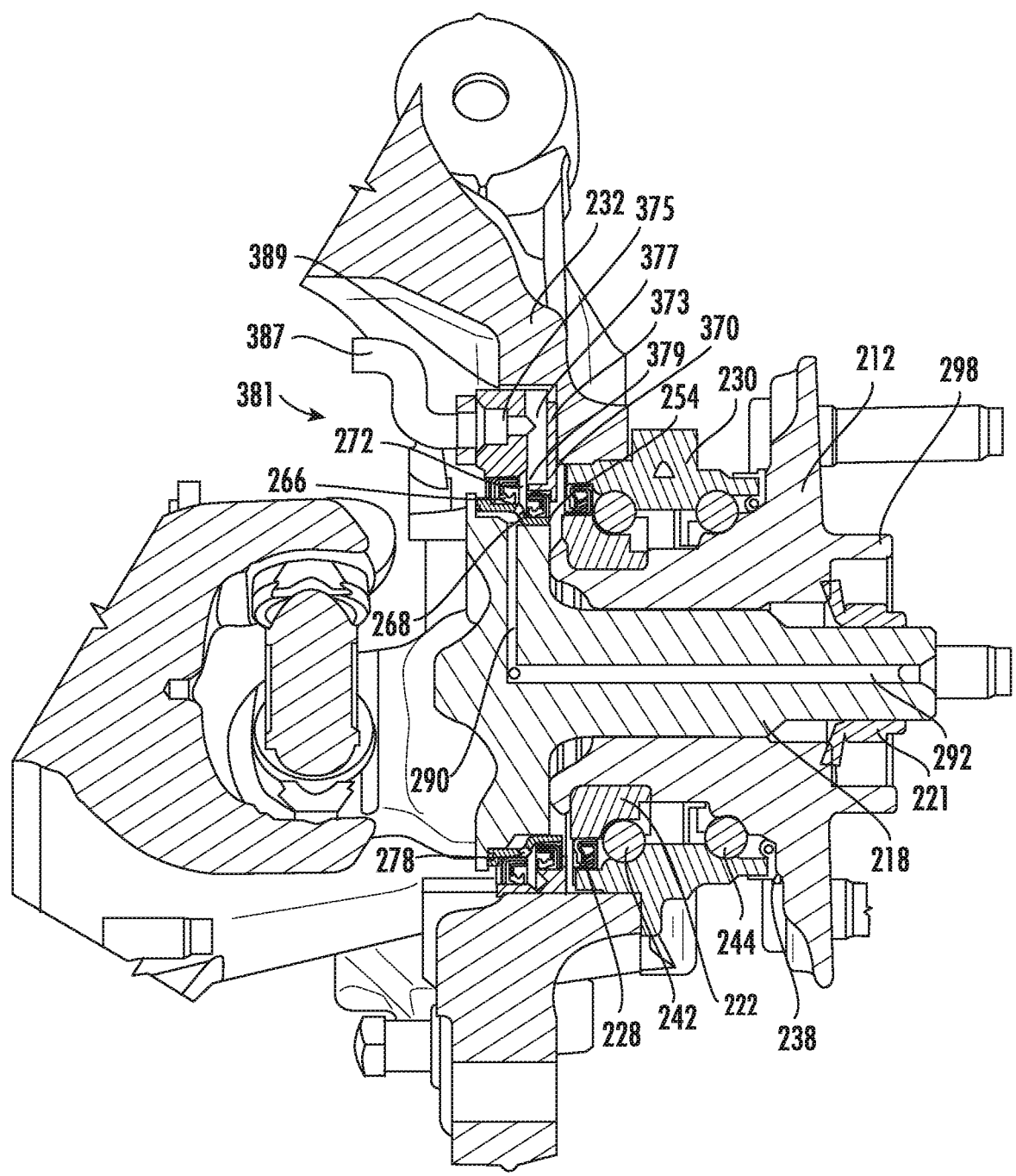
FIG. 9 is a cross-sectional view of a portion of the wheel end assembly of FIG. 8.

In another embodiment, as illustrated in FIGS. 8-11, the need for the steering knuckle port 282, as illustrated in FIG. 3, is obviated. In this embodiment, a seal housing 370 is coupled with the spindle yoke 218. The seal housing 370 comprises a portion 373 protruding therefrom in a radial direction. Referring now to FIG. 9, the portion 373 defines a port 375 extending in a direction generally parallel to a longitudinal axis of the wheel end assembly 200. The port 375 is in fluid communication with a first fluid conduit 377 extending generally perpendicular to the longitudinal axis of the wheel end assembly 200. The first fluid conduit 377 may be formed by cross-drilling, or creating an aperture in the radial direction, through the seal housing portion 373. Forming the first fluid conduit 377 via cross-drilling an aperture 377A in the seal housing portion 373 must be sealed by, for example, a ball or a plug (not depicted).

The first fluid conduit 377 is in fluid communication with a second fluid conduit 379 extending through an inner surface of the seal housing 370. In an embodiment, as illustrated in FIG. 9, the second fluid conduit 379 may comprise an annular aperture fully extending about the seal housing 373. The second fluid conduit 379 is in fluid communication with the second annular chamber 272 defined by the first and second rotary seals 266, 268, the seal housing 370, and the collector ring 254.

A tube bracket 381 may be coupled with the seal housing portion 373 to enable fluid communication between the fluid control circuit 40 and the seal housing port 375. As illustrated in FIG. 8, the tube bracket 381 may comprise one or more lobes 383 having fastener apertures 385. Fasteners (not depicted) disposed through the lobe apertures 385 may be utilized to sealingly couple the tube bracket 381 with the seal housing portion 373. The tube bracket 381 may also comprise a rigid tube 387. In an embodiment, the rigid tube 387 is in fluid communication with the fluid control circuit 40 and the port 375.

Figure 10:
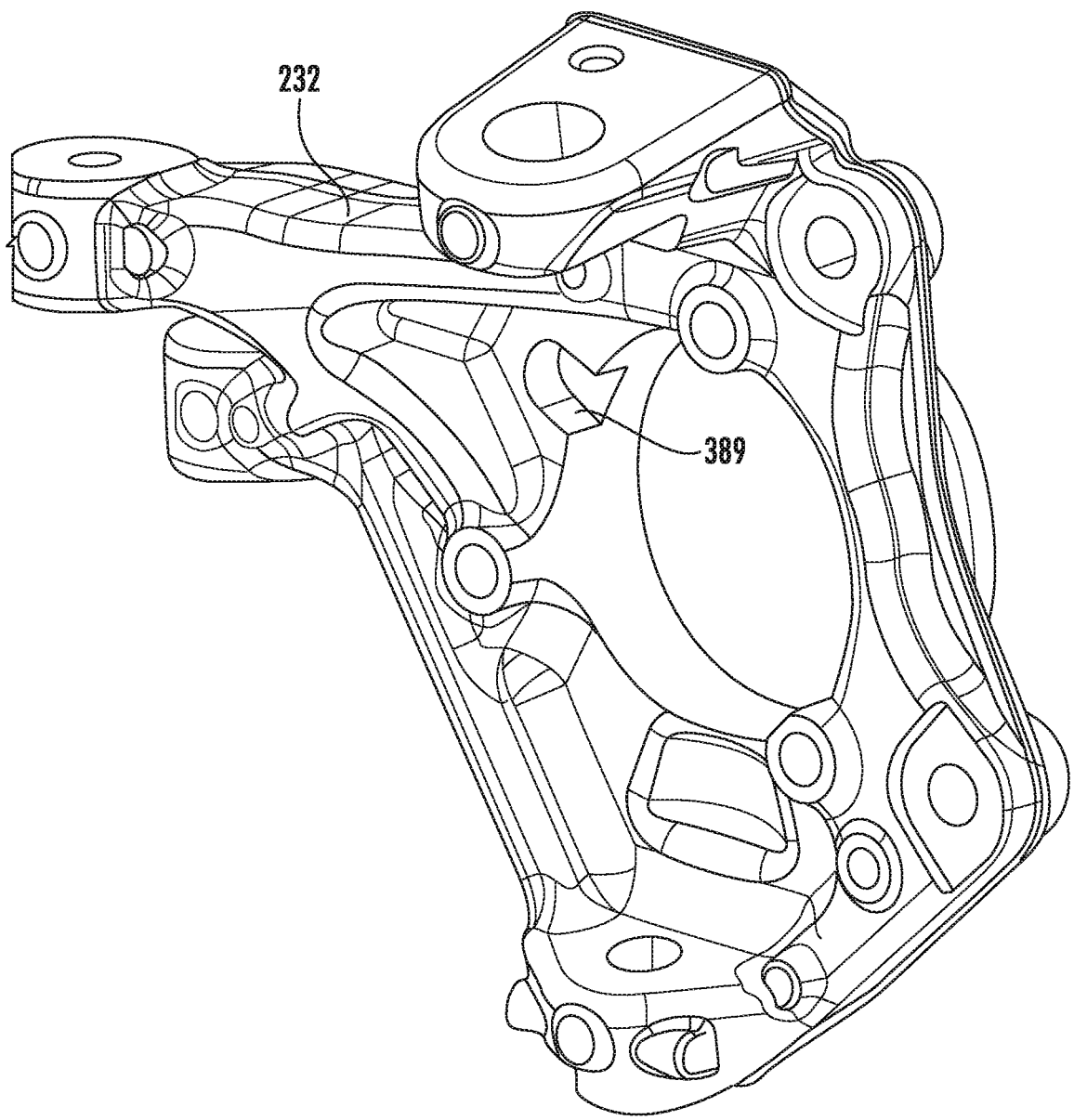
FIG. 10 is a perspective view of a steer knuckle of the wheel end assembly of FIG. 8.
Figure 11:
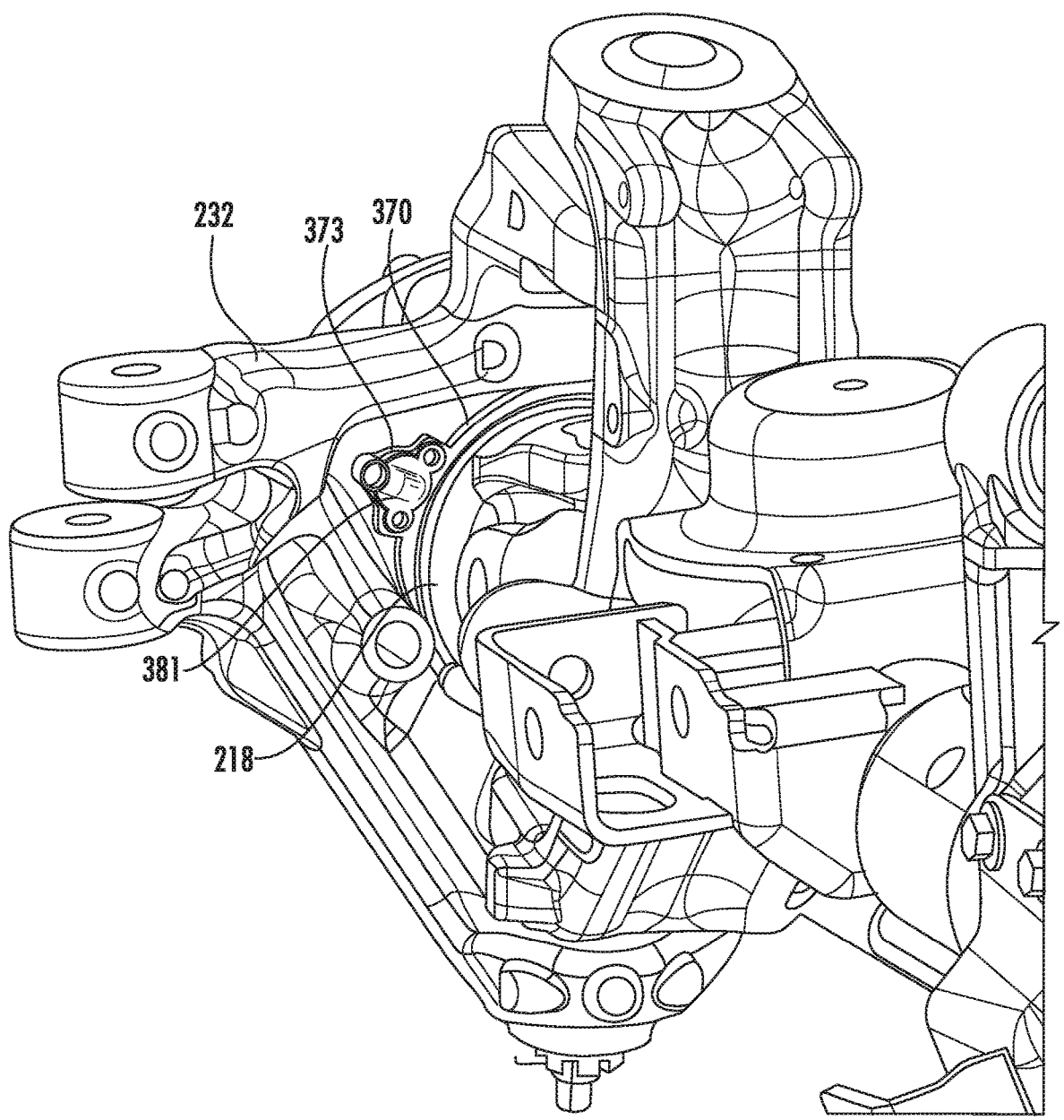
FIG. 11 is a another perspective view of the wheel end assembly of FIG. 8.

As illustrated in FIGS. 9-11, in this embodiment, the steering knuckle 232 may include an inboard recess 389 having a geometry complimentary to the geometry of the seal housing portion 373 to accommodate the seal housing portion 373.

Figure 12:
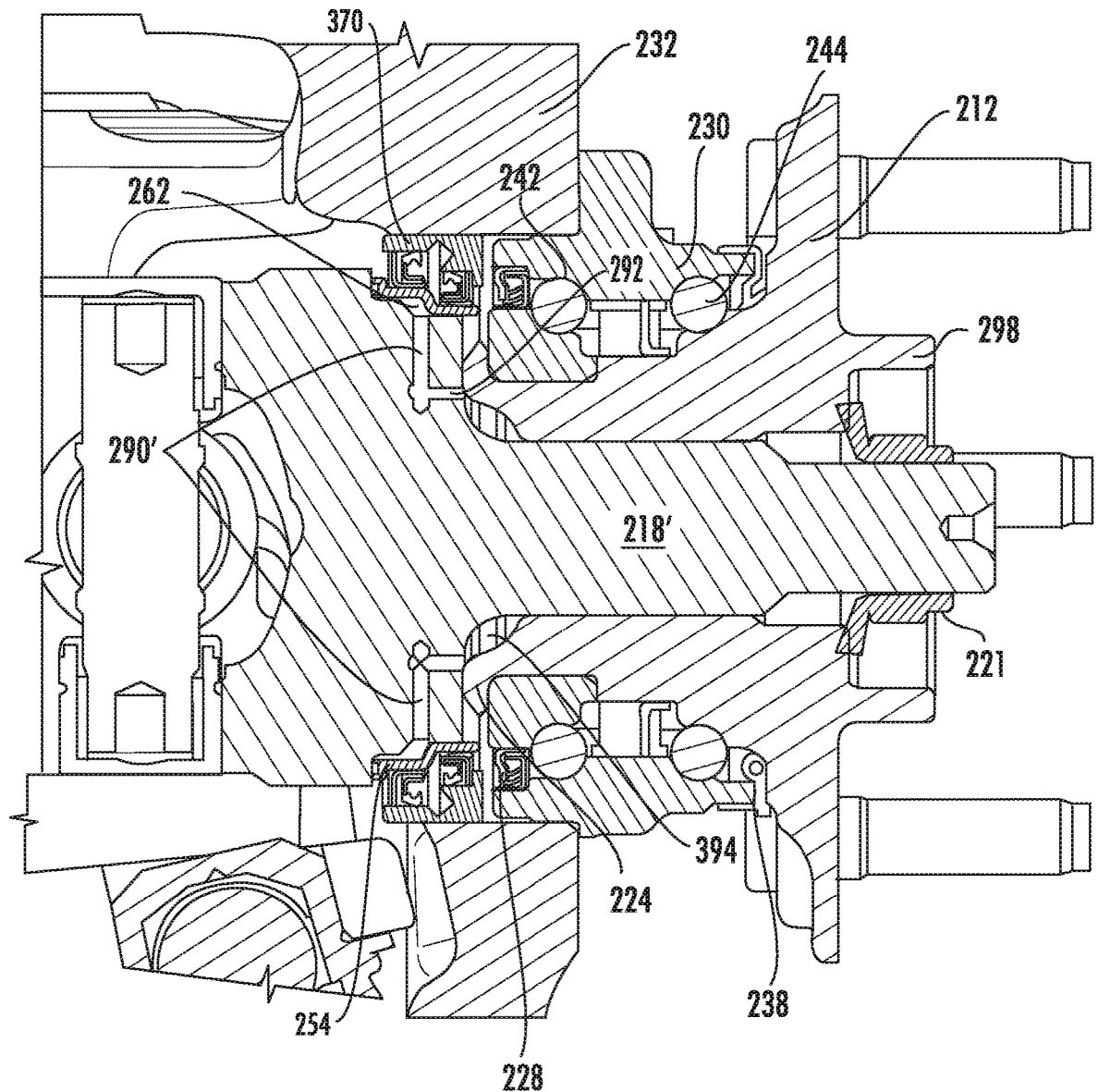
FIG. 12 is a cross-sectional view a portion of a wheel end assembly according to another embodiment of the tire inflation system of FIG. 1.
Figure 13:
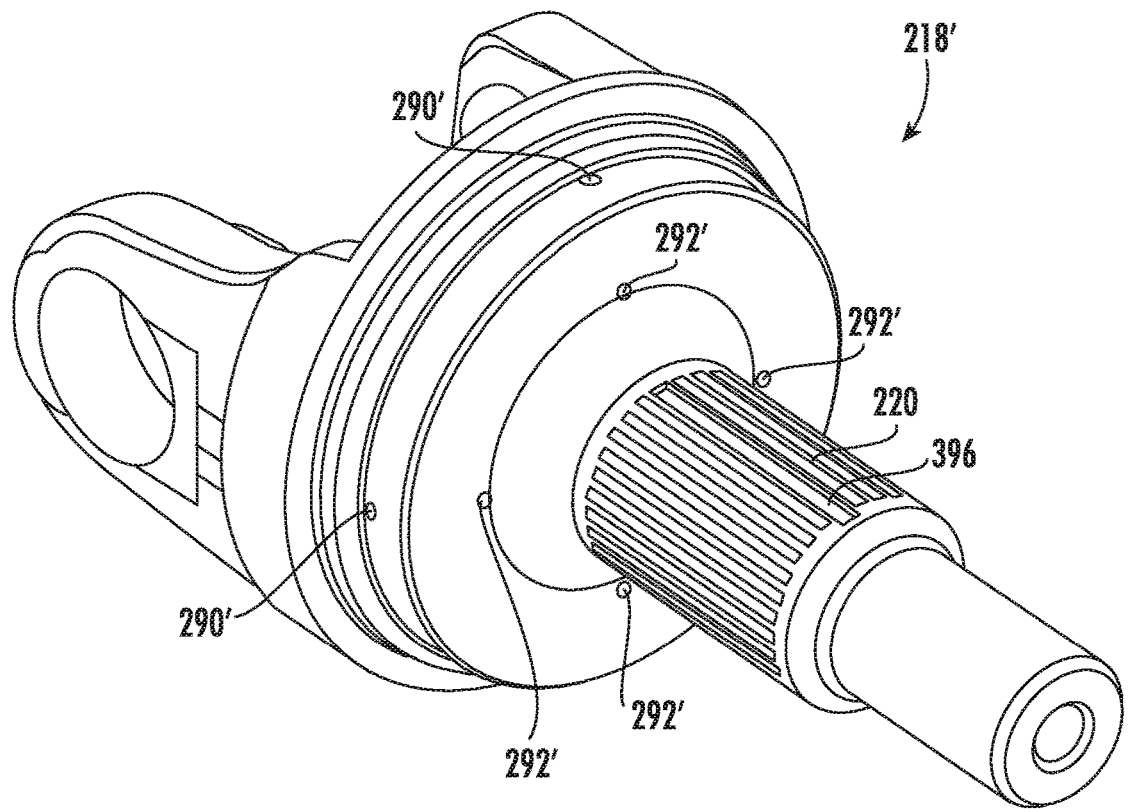
FIG. 13 is a perspective view of a spindle yoke of the wheel end assembly of FIG. 12.
Figure 14:
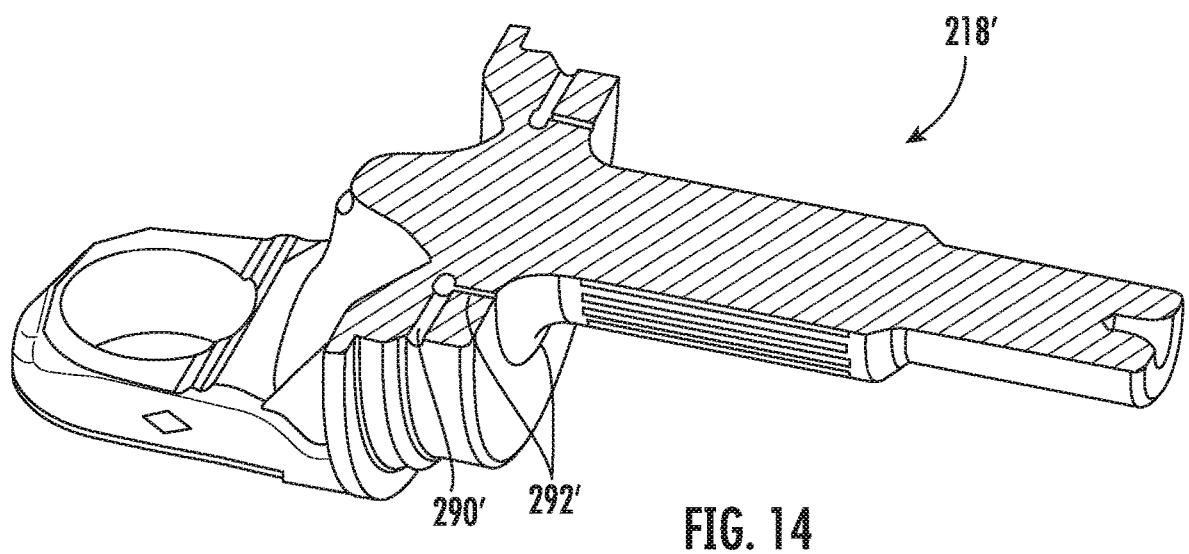
FIG. 14 is a cross sectional view of the steer knuckle of FIG. 13.

In another embodiment, as illustrated in FIGS. 12-14, one or more first spindle yoke fluid conduits 290' may extend from the first chamber 262 part way into the spindle yoke 218' in a direction generally perpendicular to the longitudinal axis of the wheel end assembly 200. A fluid chamber 394 may be defined by the inner bearing flange lip 224 and a portion of the spindle yoke 218'. The fluid chamber 394 may also be referred to herein as the inner bearing flange chamber 394. An O-ring gland or static elastomeric seal (not depicted) disposed between the inner bearing flange lip 224 and a portion of the spindle yoke 218' may be utilized to maintain fluid pressure in the fluid chamber 394. One or more second spindle yoke conduits 292' may extend generally parallel to a longitudinal axis of the spindle yoke 218', and place the first spindle yoke conduits 290' in fluid communication with the fluid chamber 394. In this embodiment, the spindle yoke 218' may comprise one or more blind splines 396. The blind splines 396 may comprise axially oriented recesses defined by the radially projecting splines 220 of the spindle yoke 218'. The blind splines 396 permit fluid flow therethrough. A hub cap 404 may be disposed about the spindle yoke 218' and sealingly engaged with the inner bearing flange outboard flange 298 to define a fluid chamber 402. The fluid chamber 402 may also be referred to herein as the hub cap chamber 402. The hub cap chamber 402 is in fluid communication with the blind splines 396. A hose 406 may be coupled with, and in fluid communication with, the hub cap fluid chamber 402 and in selective fluid communication with the tire 50.

Now referring to FIGS. 15-17, in any of the embodiments described supra, the flow path of the pressurized fluid may be in fluid communication with the hub cap chamber 402 via, for example, the second spindle yoke conduit 292 or the spindle yoke blind splines 396. As illustrated in FIG. 15, the chamber 402 may be defined by the hub cap 404 coupled with the inner bearing flange outboard flange 298. In an embodiment, the hub cap 404 may be coupled with the outboard flange 298 via threaded engagement. An O-ring may be disposed between the hubcap 404 and the wheel 54 to militate against pressurize fluid leaking to the atmosphere. Another O-ring may be disposed between the hubcap 404 and the outboard flange 298 to prevent pressurized fluid from leaking to the atmosphere. A hose 406 may be coupled with an outboard surface of the hubcap 404 at a first end thereof. In an embodiment, the hose 406 may be a pipe. The hose 406 may be coupled with a radially inner surface of the wheel 54 at a second end thereof. A wheel valve 408 may be disposed in the fluid path of the hose 406 for selective fluid communication between the chamber 402 and the wheel 54.

In an embodiment, as illustrated in FIG. 16, the hubcap 404 may be coupled with the wheel 54 via threaded engagement. One or more O-rings may be utilized to prevent the undesired transfer of pressurized fluid from the chamber 402 to the atmosphere, as described above. The chamber 402 may be in fluid communication with the wheel 54 via a wheel rim conduit 410. The wheel rim conduit 410 extends radially from an inner surface 412 at least partially defining the chamber 402, to a radially outer surface 414. The wheel valve 408 may be disposed in the fluid path of the wheel rim conduit for selective fluid communication between the chamber 402 and the wheel 54. In this embodiment, no hose is necessary to communicate fluid from the hub assembly 205 to the wheel 54.

In still another embodiment, as illustrated in FIG. 17, the chamber 402 is in fluid communication with a circular manifold 416. The circular manifold 416 may be coupled with the rotor 252 and the wheel 54. In an embodiment, the circular manifold 416 is disposed about the inner bearing flange outboard flange 298. A hose 406 may be coupled with, and in fluid communication with, the circular manifold 416. The hose 406 may also be coupled with the wheel 54. In addition, the wheel valve 408 may be disposed in the fluid path of the hose 406 for selective fluid communication between the chamber 402 and the wheel 54.

One or more features of the embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An axle assembly comprising:
   a spindle yoke defining at least one fluid conduit therethrough;
   a collector ring disposed about said spindle yoke;
   a seal housing coupled with a knuckle, wherein said seal housing is disposed coaxially with said collector ring;
   a first rotary seal disposed radially between said collector ring and said seal housing;
   a second rotary seal disposed radially between said collector ring and said seal housing; and
   a port disposed in said knuckle, wherein said port is in fluid communication with said spindle yoke at least one fluid conduit via said seal housing and said collector ring.

2. The axle assembly of claim 1, wherein said collector ring further comprises:
   a first radially inner surface;
   a second radially inner surface, wherein said second surface and a surface of said spindle yoke define a collector ring chamber; and
   an aperture through said collector ring in fluid communication with said collector ring chamber.

3. The axle assembly of claim 1, wherein:
   said collector ring, said seal housing, said first rotary seal, and said second rotary seal define a seal chamber.

4. The axle assembly of claim 1, wherein said seal housing further comprises:
   a radially outer surface defining an annular recess, wherein said recess and a surface of said knuckle define a seal housing chamber; and
   an aperture through a radially inner surface of said seal housing in fluid communication with said recess.

5. The axle assembly of claim 1, wherein said spindle yoke further comprises:
   at least one first conduit in fluid communication with a collector ring chamber defined by said collector ring and said spindle yoke; and
   at least one second conduit in fluid communication with said at least one first conduit.

6. The axle assembly of claim 5, wherein:
   said at least one first conduit is disposed transverse to a longitudinal axis of said spindle yoke; and
   said at least one second conduit is disposed parallel to a longitudinal axis of said spindle yoke.

7. The axle assembly of claim 5, wherein said at least one second conduit comprises:
   a single conduit disposed coaxially with a longitudinal axis of said spindle yoke.

8. The axle assembly of claim 5, further comprising:
   an inner bearing flange disposed about said spindle yoke; and
   an inner bearing flange chamber defined by said inner bearing flange and said spindle yoke, wherein said at least one second conduit is in fluid communication with said inner bearing flange chamber.

9. The axle assembly of claim 8, wherein said spindle yoke comprises:
   a blind spline in fluid communication with said inner bearing flange chamber.

10. An axle assembly comprising:
a spindle yoke defining at least one fluid conduit therethrough;
a collector ring disposed about said spindle yoke;
a seal housing coupled with a knuckle, wherein said seal housing is disposed coaxially with said collector ring;
a first rotary seal disposed radially between said collector ring and said seal housing;
a second rotary seal disposed radially between said collector ring and said seal housing; and
a port disposed in said seal housing, wherein said port is in fluid communication with said spindle yoke at least one fluid conduit via said seal housing and said collector ring.

11. The axle assembly of claim 10, further comprising:
a tube bracket coupled with said seal housing, wherein said tube bracket is in fluid communication with said port.

12. The axle assembly of claim 10, wherein said seal housing further comprises:
a portion protruding in a radial direction, wherein said port is defined by said portion;
a fluid conduit disposed through said portion, wherein said fluid conduit is in fluid communication with said port; and
an aperture through a radially inner surface of said seal housing in fluid communication with said fluid conduit.

13. The axle assembly of claim 12, wherein said knuckle further comprises:
a recess in an inboard surface thereof, wherein said seal housing radially protruding portion is at least partially disposed within said recess.

14. The axle assembly of claim 10, wherein said collector ring further comprises:
a first radially inner surface;
a second radially inner surface, wherein said second surface and a surface of said spindle yoke define a collector ring chamber; and
an aperture through said collector ring in fluid communication with said collector ring chamber.

15. The axle assembly of claim 10, further comprising:
a hub cap coupled with an inner bearing flange disposed about said spindle yoke, wherein said hub cap and said inner bearing flange define a hub cap chamber in fluid communication with a blind spline of said spindle yoke;
a hose in fluid communication with said hub cap chamber; and
a tire in selective fluid communication with said hose.

* * * * *